US012331913B2

(12) United States Patent
Lin et al.

(10) Patent No.: US 12,331,913 B2
(45) Date of Patent: Jun. 17, 2025

(54) METHOD FOR MANUFACTURING ELECTRONIC CONSTRUCTIVE OBJECT AND ELECTRONIC CONSTRUCTIVE OBJECT THEREOF

(71) Applicants: Chih-Hung Lin, Nanjing County (CN); Kun-Chuan Chang, Nanjing County (CN); Keng-Yu Tsao, Nanjing County (CN); Yu-Hsuan Sung, Nanjing County (CN)

(72) Inventors: Chih-Hung Lin, Nanjing County (CN); Kun-Chuan Chang, Nanjing County (CN); Keng-Yu Tsao, Nanjing County (CN); Yu-Hsuan Sung, Nanjing County (CN)

(73) Assignee: PIN SHINE ELECTRONIC (ZHANGHOU) CO., LTD., Nanjing (CN)

( * ) Notice: Subject to any disclaimer, the term of this patent is extended or adjusted under 35 U.S.C. 154(b) by 188 days.

(21) Appl. No.: 18/091,364

(22) Filed: Dec. 29, 2022

(65) Prior Publication Data

US 2024/0219012 A1 Jul. 4, 2024

(51) Int. Cl.
*F21V 23/04* (2006.01)
*A63H 33/04* (2006.01)

(52) U.S. Cl.
CPC ....... *F21V 23/0414* (2013.01); *A63H 33/042* (2013.01); *Y10T 29/49117* (2015.01)

(58) Field of Classification Search
CPC .......................... A63H 33/086; A63H 33/042; F21V 23/0414; F21V 17/10; Y10T 29/49117
USPC .................................. 29/825, 829, 846, 852
See application file for complete search history.

(56) References Cited

U.S. PATENT DOCUMENTS

| | | | | |
|---|---|---|---|---|
| 9,474,986 | B2 * | 10/2016 | Drylie | A63H 33/001 |
| 11,009,276 | B1 * | 5/2021 | Clark | B30B 11/02 |

* cited by examiner

*Primary Examiner* — Thiem D Phan
(74) *Attorney, Agent, or Firm* — Chun-Ming Shih; LANWAY IPR SERVICES

(57) ABSTRACT

The method plans a predetermined circuit pattern on an inner surface of a constructive object and plans a contact portion on an outer surface of the constructive object for external electric connection. Laser is used to scan an area in which both the circuit pattern and the contact portion are located. A through hole is formed to make both the circuit pattern and the contact portion uninsulated and to form an irregular roughened surface on the area scanned by heat of the laser. A layer of conductive material is deposited on the roughened surface by a mixture of a catalyst solution and metal powder. The constructive object is immersed in a reaction tank to implement electroless plating to gradually thicken the layer of conductive material to become a conductor. The conductor penetrating the through hole makes the circuit pattern and the contact portion electrically connected.

8 Claims, 10 Drawing Sheets

METHOD FOR MANUFACTURING ELECTRONIC CONSTRUCTIVE OBJECT AND ELECTRONIC CONSTRUCTIVE OBJECT THEREOF

BACKGROUND

Technical Field

The invention relates to constructive objects such as toy blocks, particularly to a method for manufacturing an electronic constructive object and an electronic constructive object thereof.

Related Art

Toy blocks can be combined to be any specific model such as a house, car, etc. The building process may stimulate learning of brains and create unlimited imagination. With the progress of technologies, the design of toy blocks becomes more and more accurate and various. Besides changeful color, constructions built by toy blocks are not limited to be still any more, but develop toward dynamic, voiced and lighted. Thus, various interest rises.

Dynamic toy blocks need electrification to support. That is, a block needs to be installed with an electronic circuit for driving something. The simplest way is, as shown in FIG. 8, to install a circuit board or some electronic passive components 80 in association with an electric circuit 81. When blocks 8 have been constructed to be a model, it can be driven, voiced or lighted by connecting the electric circuit 81 to LEDs, a speaker or a motor. However, the electric connection between blocks 8 is implemented by one or more elastic metal bars 82 projecting from the block 8. Such metal bars 82 not only increase the manufacturing costs but also have to be hidden in the block 8 with connecting to the electric circuit 81. This makes the circuit in the block 8 more complicated and chaotic, causes a risk of wire disconnection and increases more processes, so it is difficult to be mass-produced.

SUMMARY

An object of the invention is to provide an electronic constructive object of the invention, which shortens the manufacturing process and is advantageous to mass-production. Also, the electronic constructive objects made by the method have great yield rate and stability.

To accomplish the above object, the method for manufacturing an electronic constructive object of the invention includes the steps of:

a) producing an insulative three-dimensional member having a room and an opening communicating with the room;
b) forming a connecting mechanism on an outer surface of the three-dimensional member;
c) planning a predetermined circuit pattern on an inner surface of the room through the opening;
d) planning a contact portion on an outer surface of the three-dimensional member for external electric connection;
e) scanning an area in which both the circuit pattern and the contact portion are located by laser;
f) forming a through hole between the circuit pattern and the contact portion with the laser to make both the circuit pattern and the contact portion uninsulated, and forming a roughened surface on the area scanned by heat of the laser;
g) depositing a layer of conductive material on the roughened surface by a mixture of a catalyst solution and metal powder, wherein a region on which the layer of conductive material is deposited comprises the circuit pattern, the contact portion and an inner wall of the through hole; and
h) immersing the three-dimensional member in a reaction tank to implement electroless plating to gradually thicken the layer of conductive material to become a conductor, wherein the conductor penetrating the through hole makes the circuit pattern and the contact portion electrically connected.

The invention also provides an electronic constructive object, which includes a first electric block having a first contact portion on a surface thereof and a second electric block having a second contact portion on a surface thereof. When the first electric block and the second electric block are combined by a connecting mechanism, the first contact portion of the first electric block and the second contact portion of the second electric block are electrically connected.

DETAILED DESCRIPTION

Figure 1:
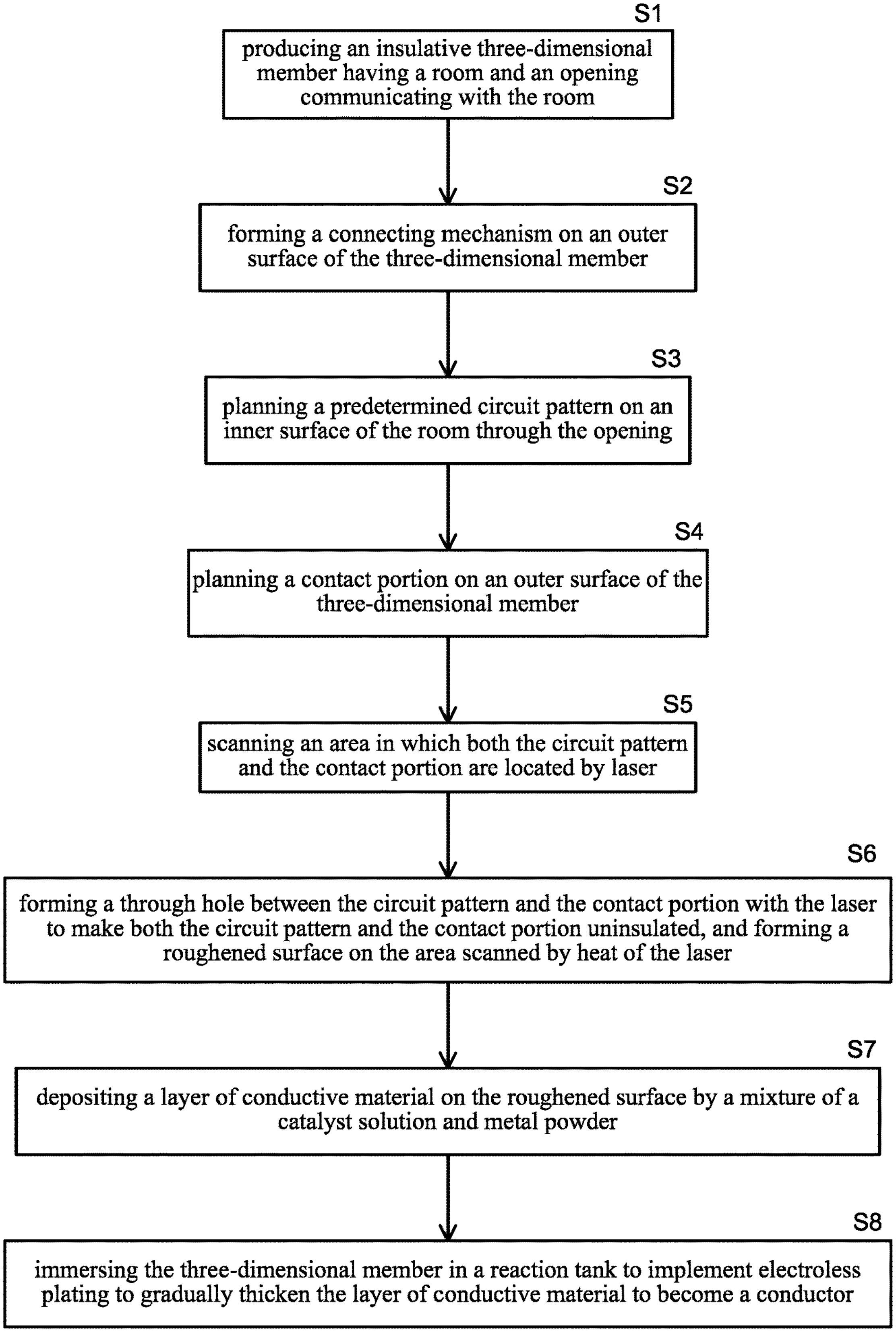
FIG. 1 is a flowchart of the method of the invention.
Figure 2:
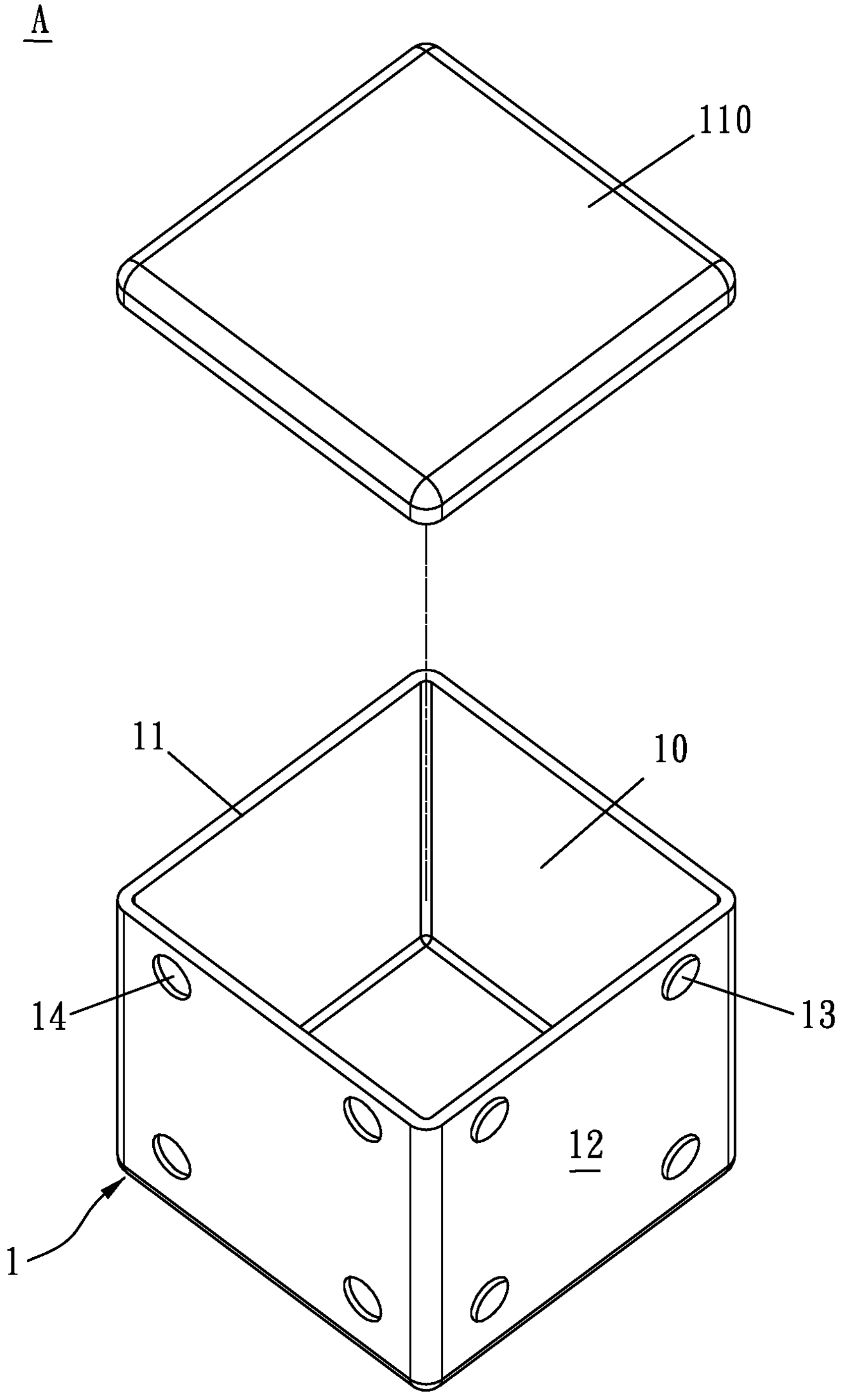
FIG. 2 is a schematic view of the three-dimensional member of the invention.

The invention provides a method for manufacturing an electronic constructive object, such as, but not limited to, toy blocks. The technical contents of this disclosure will become apparent with the detailed description of embodiments accompanied with the illustration of related drawings as follows. It is intended that the embodiments and drawings disclosed herein are to be considered illustrative rather than restrictive.

Please refer to FIGS. 1-2 and 3A-3C. The invention provides a method for manufacturing an electronic constructive object A. In step 1 (S1), an insulative three-dimensional member 1 is produced, which may be made of, but not limited to, plastic, wood or ceramic. The three-dimensional member 1 includes a room and an opening 11 communicating with the room 10. Preferably, the three-dimensional member 1 further includes a cover 110 which may be used to close the opening 11.

In step 2 (S2), a connecting mechanism is formed on an outer surface 12 of the three-dimensional member 1. The connecting mechanism may be a protrusion 13 or an indent 14 or both a protrusion 13 and an indent 14. The protrusion 13 matches with the indent 14 in shape so that the protrusion 13 can be embedded into the indent 14 for tight connection. Alternatively, the indent 14 may also be replaced with a through hole.

Figure 3A:
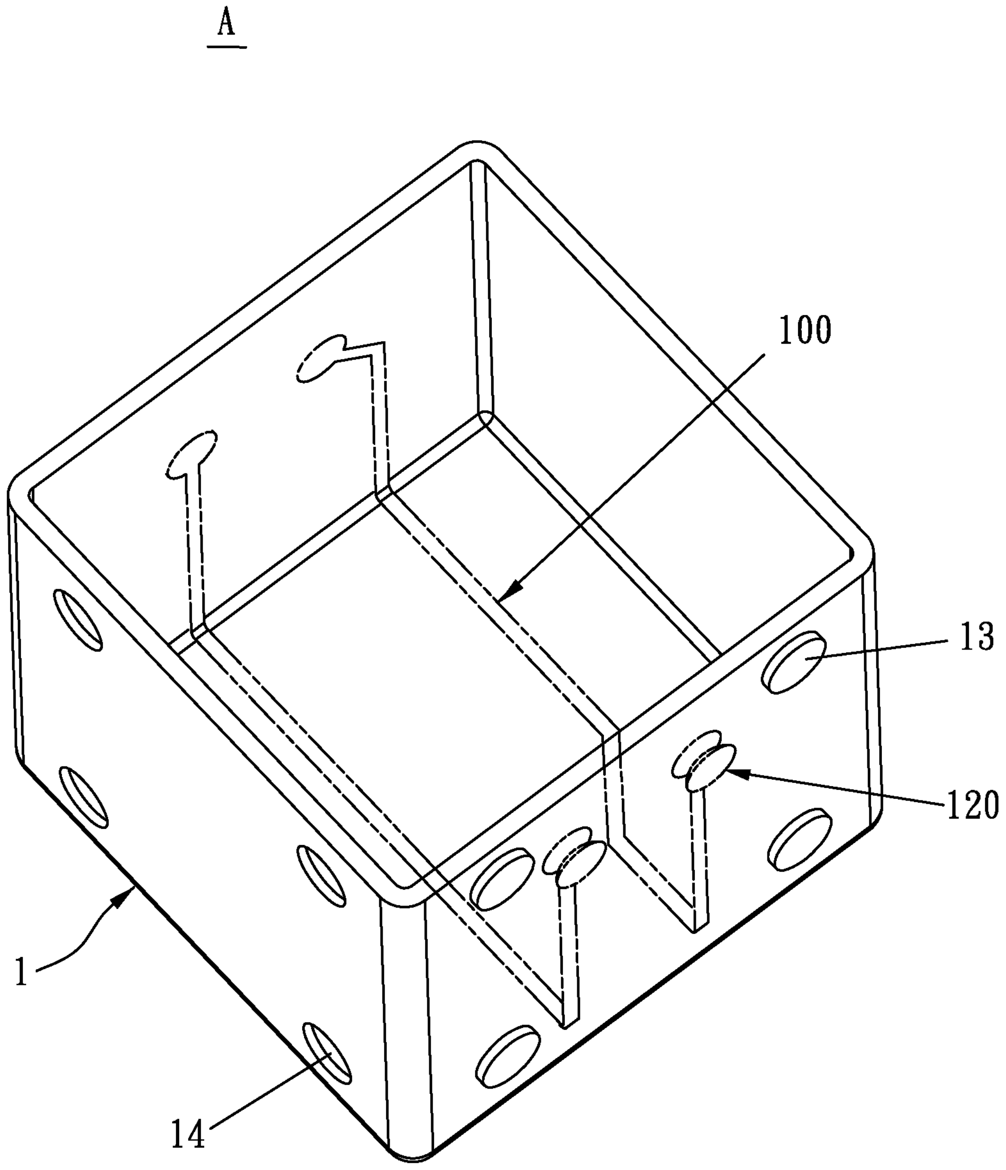
FIGS. 3A-3C are structural schematic views of electrification of the three-dimensional member of the invention.

In step 3 (S3), a predetermined circuit pattern 100 is planned on an inner surface of the room 10 through the opening 11 as shown in FIG. 3A.

In step 4 (S4), at least one contact portion 120 is planned on an outer surface 12 of the three-dimensional member 1 for external electric connection.

In step 5 (S5), an area in which both the circuit pattern 100 and the contact portion 120 are located is scanned by laser.

In step 6 (S6), a through hole 15 is formed between the circuit pattern 100 and the contact portion 120 with the laser to make both the circuit pattern and the contact portion uninsulated and an irregular roughened surface 100*a* is formed on the area scanned by heat of the laser.

Figure 3B:
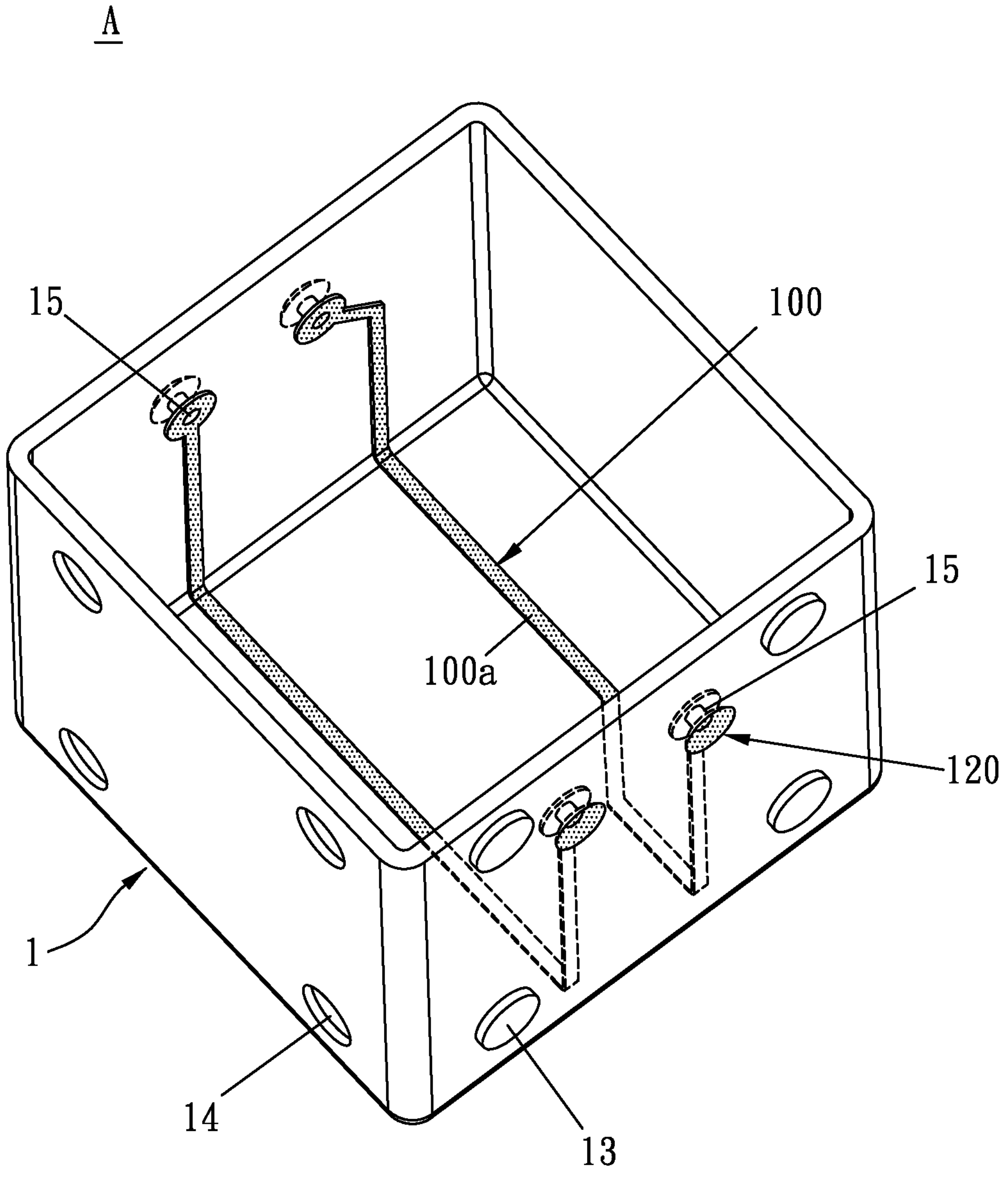

In step 7 (S7), a layer of conductive material is deposited on the roughened surface 100*a* by a mixture of a catalyst solution and metal powder (such as copper, nickel, etc.) as shown in FIG. 3B. A region on which the layer of conductive material is deposited includes the circuit pattern 100, the contact portion 120 and an inner wall of the through hole 15.

Figure 3C:
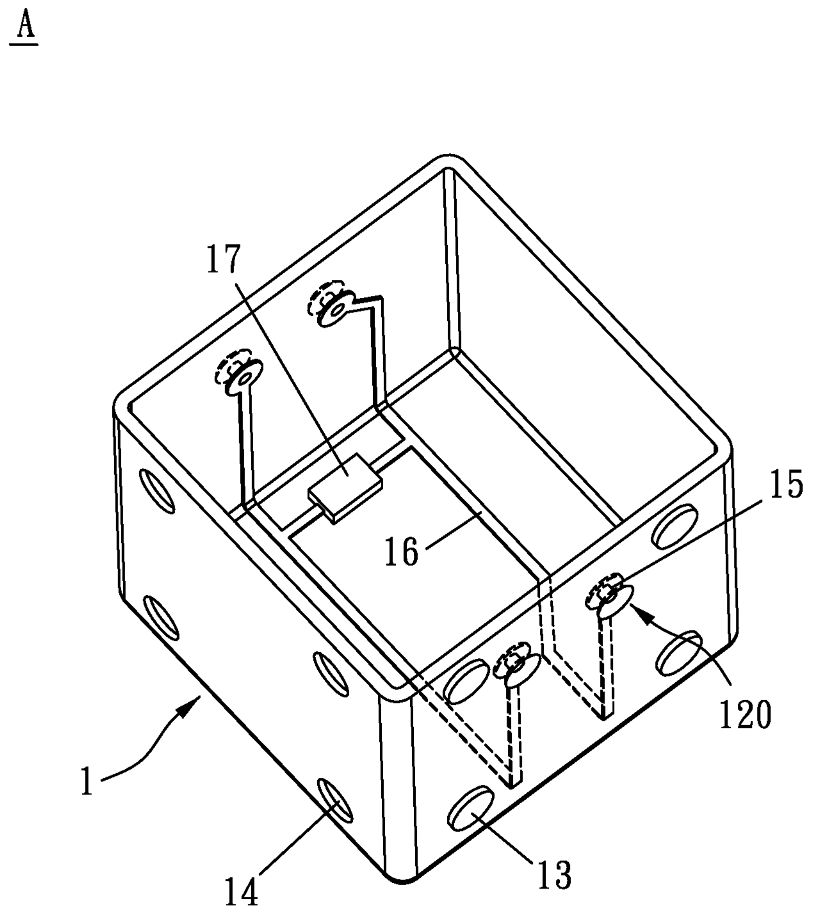

In step 8 (S8), the three-dimensional member 1 is immersed in a reaction tank to implement electroless plating to gradually thicken the layer of conductive material to become a conductor 16 as shown in FIG. 3C. The conductor 16 penetrating the through hole 15 makes the circuit pattern 100 and the contact portion 120 electrically connected.

By the above method, after the circuit pattern 100, the contact portion 120 and the through hole 15 are scanned by laser to form the irregular roughened surface 100*a*, quasi-mechanic riveting or fastening is formed between the conductive material deposited in step 7 and the roughened surface 100*a*. A great connection can be generated between the conductor 16 formed by thickened conductive layer in step 8 and the insulative three-dimensional member 1 to make the inner surface and the outer surface of the insulative three-dimensional member 1 able to form an electric circuit and electrically connect to each other. The three-dimensional member 1 can make an electrified application as long as one or more electric elements 17 such as a passive element and/or a semiconductor chip are soldered on the electric circuit. Particularly, the manufacturing method of the invention is advantageous to the mechanism of automation and mass-production. In comparison with the prior art, the manufacturing costs can be reduced and chaos of the circuit in the block will not occur.

Figure 4:
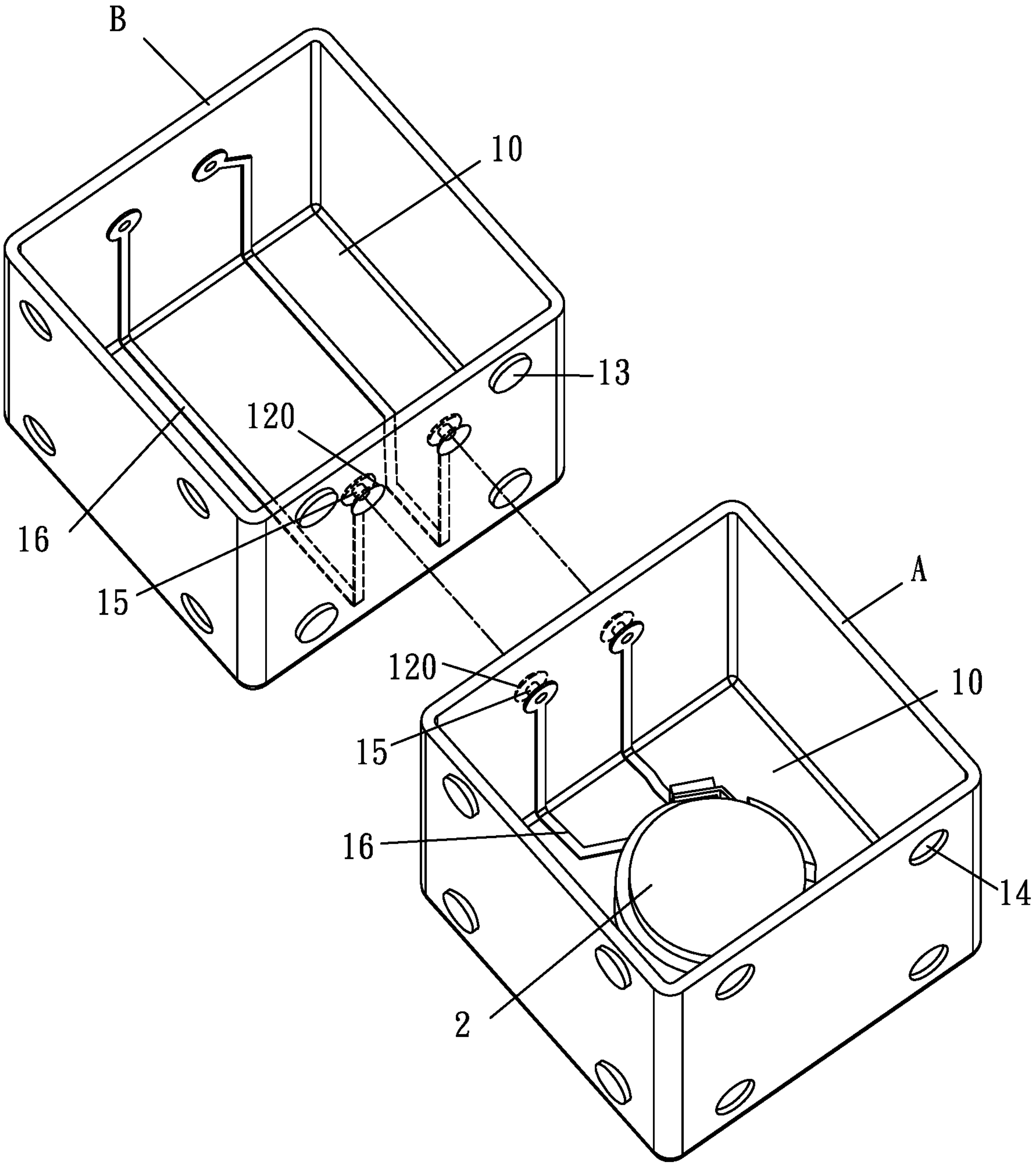
FIG. 4 is a schematic view of connection of two electronic constructive objects of the invention.

Please refer to FIG. 4. In the embodiment shown in FIG. 4, there are two electric blocks made by the above method, namely, a first electric block A and a second electric block B. An outer surface of each of the first electric block A and the second electric block B is provided with at least one protrusion 13 and at least one indent 14. Thus, the first electric block A and the second electric block B can be connected together by embedding the protrusion 13 of the first electric block A into the indent 14 of the second electric block B.

In addition, a battery 2, which is connected onto the conductor 16 of the room 10, is received in the room 10 of the first electric block A. The conductor 16 extends from a surface of the room 10 to pass the through hole 15 and reach the contact portion 120 on the outer surface. The room 10 of the second electric block B is also formed with a conductor 16, and the conductor 16 also extends from a surface of the room 10 to pass the through hole 15 and reach the contact portion 120 on the outer surface. As a result, the first electric block A serves as a power supply module, and the second electric block B serves as an electric transmission module. When the protrusion 13 of the first electric block A is embedded into the indent 14 of the second electric block B to make the first and second electric blocks A, B connected, the contact portion 120 on the outer surface of the first electric block A connects with the contact portion 120 on the outer surface of the second electric block B so as to transmit electricity of the first electric block A serving as a power supply module to the second electric block B.

Figure 5:
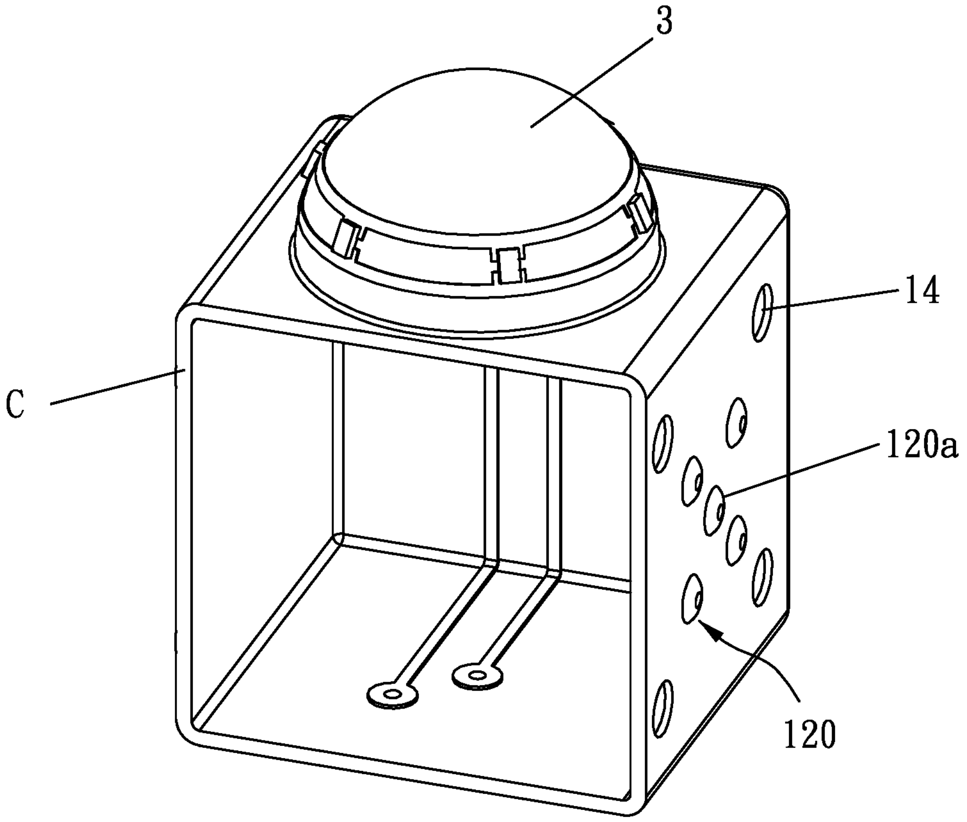
FIG. 5 is a schematic view of the electronic constructive object of the invention connecting with an electric element such as a touch switch.
Figure 6:
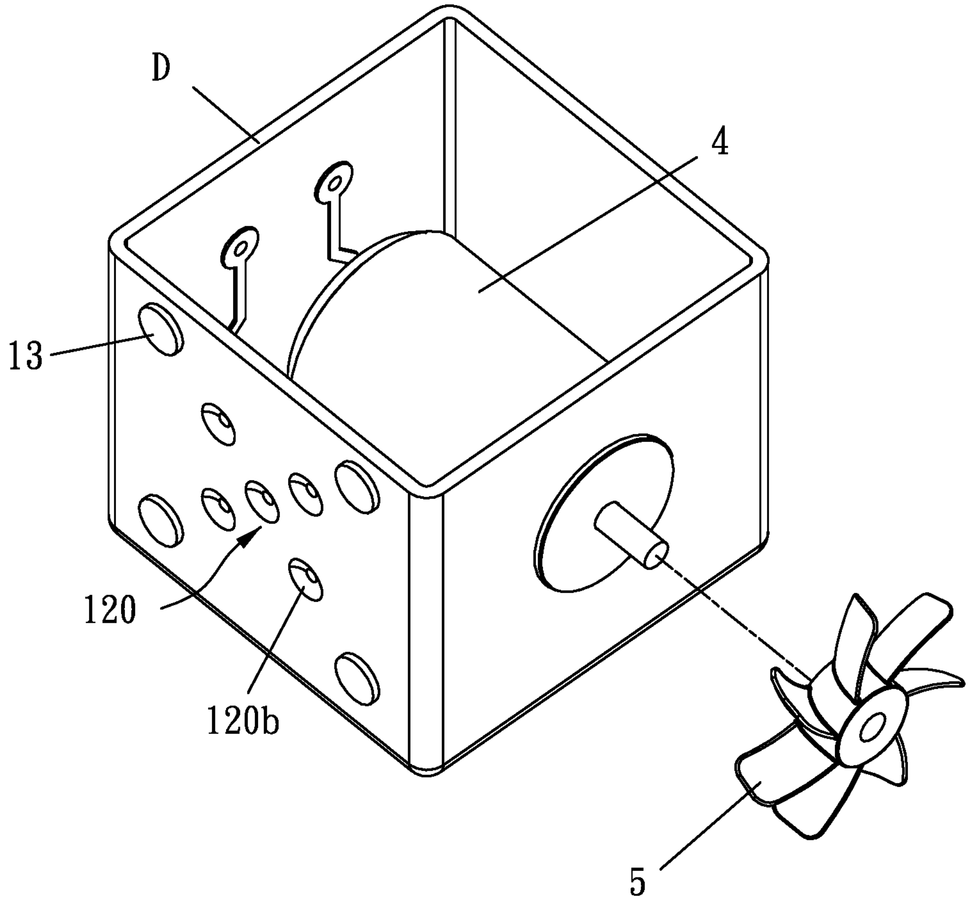
FIG. 6 is a schematic view of the electronic constructive object of the invention connecting with an electric element such as a motor and a fan.
Figure 7:
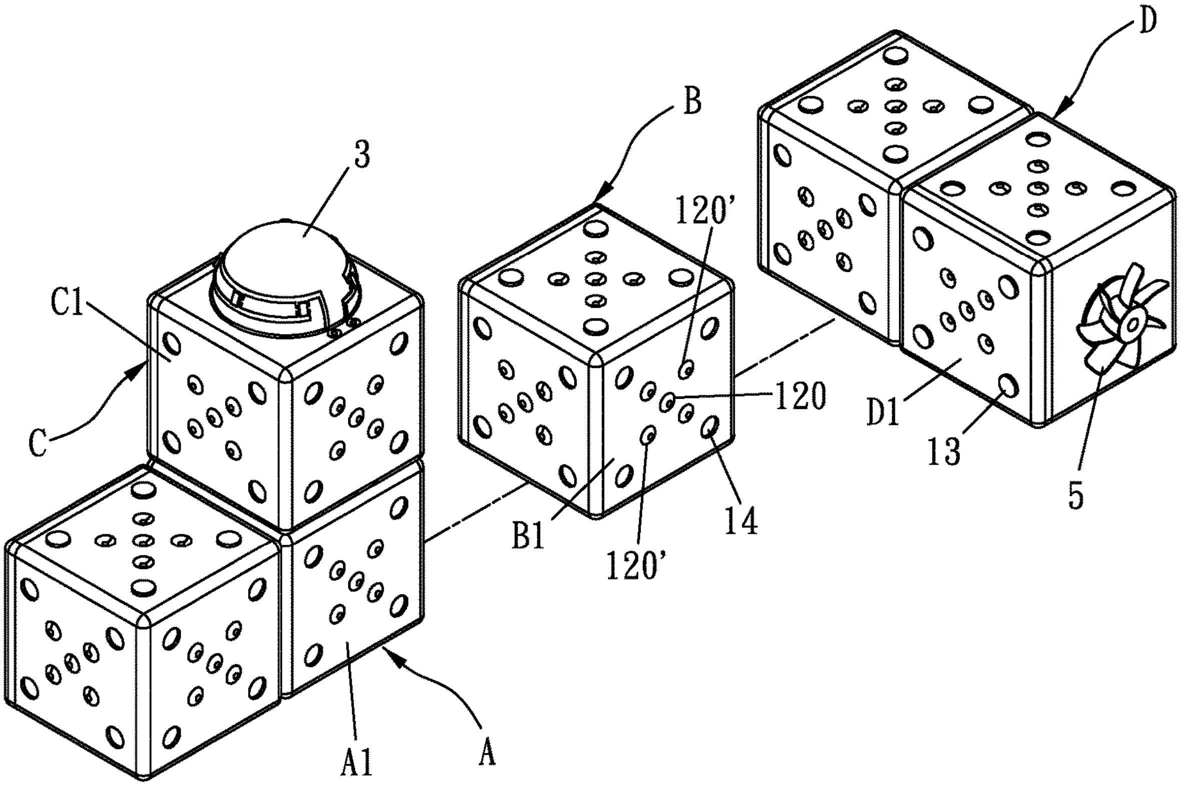
FIG. 7 is a schematic view of multiple electronic constructive objects of the invention, which are constructed as toy blocks.
Figure 8:
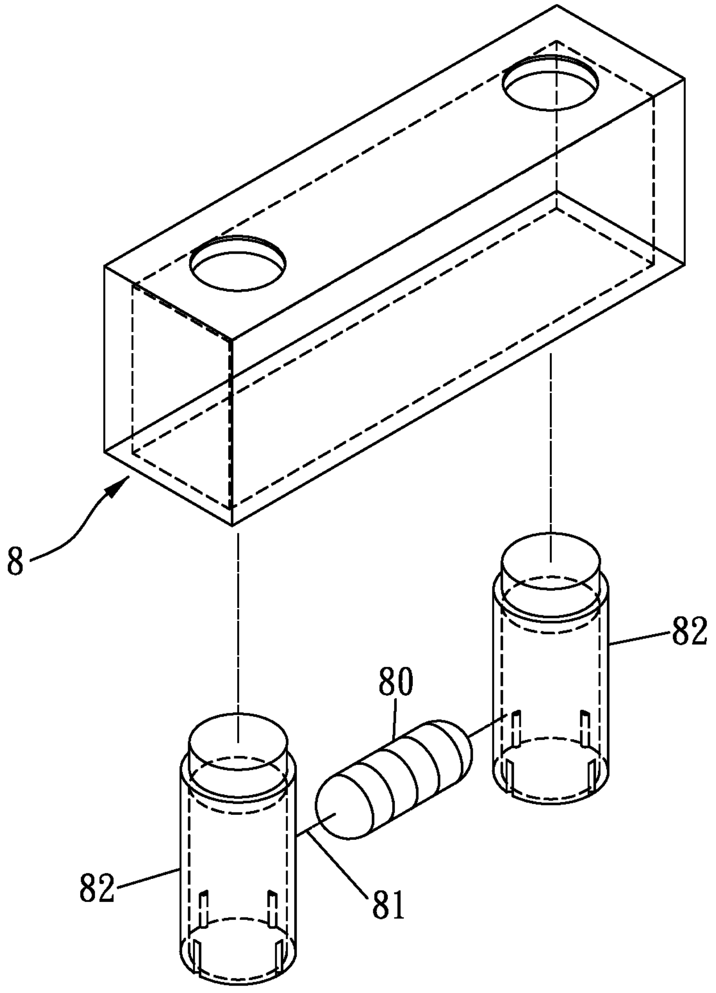
FIG 8 PRIOR ART
FIG. 8 is a schematic view of a conventional electric toy block.

Please refer to FIGS. 5-7. Multiple electric blocks made the method of the invention can be constructed as toy blocks to become various models such as a house, a car, etc. Besides the first electric block A and the second electric block B, the invention further includes a third electric block C as shown in FIG. 5. The contact portion 120 on an outer surface of the third electric block C is connected to a touch switch 3. The room 10 of a fourth electric block D shown in FIG. 6 is connected to a fan 5 driven by a driving device such as a motor 4 via the conductor 16. Multiple electric blocks A, B, C, D are constructed together through their respective protrusions 13 and the indents 14 as shown in FIG. 7, the contact portions 120 of the electric blocks A, B, C, D are in contact portion with each other so that the battery 2 can supply electric power to the motor 4 and the fan 5 through the touch switch 3. As a result, the electric blocks of the invention can make some special effects which are different from prior arts.

Preferably, the contact portion 120 has a three-dimensional outline. Please refer to FIG. 5. The contact portion 120 has a convex surface 120*a* disposed on the same outer surface as the one the indent 14 is located on. Please refer to FIG. 6. The contact portion 120 has a concave surface 120*b* disposed on the same outer surface as the one the protrusion 13 is located on. In other words, when the third electric block C of FIG. 5 is connected with the fourth electric block D of FIG. 6, the two contact portions 120 are connected by the convex surface 120*a* and the concave surface 120*b*. This provides larger contact portion areas to advantageous to electric connection.

Please refer to FIG. 7. After the outline, shape and size of each electric block A, B, C, D has been standardized, a contact surface A1, B1, C1, D1 of each electric block A, B, C, D, which is used to connect with another one, is provided with multiple contact portions 120 which are disposed on the same position and have the same amount (as shown in the figure, each electric block A, B, C, D has five contact portions 120). This is advantageous to the manufacture of electric block kits without individual customization to control the costs and improve the industrial utilization. Particularly, while each contact surface A1, B1, C1, D1 is being disposed with contact portions 120, 120', the contact portion 120 connected to the positive end of electricity is placed at the center of each contact surface A1, B1, C1, D1, and the other contact portions 120' are placed a peripheral position to connect the negative end of electricity to avoid a wrong electric connection in polarity.

While this disclosure has been described by means of specific embodiments, numerous modifications and variations could be made thereto by those skilled in the art without departing from the scope and spirit of this disclosure set forth in the claims.

What is claimed is:

1. A method for manufacturing an electronic constructive object, comprising:

a) producing an insulative three-dimensional member having a room and an opening communicating with the room;

b) forming a connecting mechanism on an outer surface of the three-dimensional member;

c) planning a predetermined circuit pattern on an inner surface of the room through the opening;

d) planning a contact portion on an outer surface of the three-dimensional member for external electric connection;

e) scanning an area in which both the circuit pattern and the contact portion are located by laser;

f) forming a through hole between the circuit pattern and the contact portion with the laser to make both the circuit pattern and the contact portion uninsulated, and forming a roughened surface on the area scanned by heat of the laser;

g) depositing a layer of conductive material on the roughened surface by a mixture of a catalyst solution and metal powder, wherein a region on which the layer of conductive material is deposited comprises the circuit pattern, the contact portion and an inner wall of the through hole; and h) immersing the three-dimensional member in a reaction tank to implement electroless plating to gradually thicken the layer of conductive material to become a conductor, wherein the conductor penetrating the through hole makes the circuit pattern and the contact portion electrically connected.

2. An electronic constructive object manufactured as the method of claim 1 comprising:

a first electric block having a first contact portion on a surface thereof and a first room therein; and a second electric block having a second contact portion on a surface thereof and a second room therein;

wherein when the first electric block and the second electric block are combined by a connecting mechanism, the first contact portion of the first electric block and the second contact portion of the second electric block are electrically connected.

3. The electronic constructive object of claim 2, wherein the contact portion of the first electric block has a convex surface, and the contact portion of the second electric block has a concave surface.

4. The electronic constructive object of claim 3, wherein the connecting mechanism of the first electric block has an indent, and the connecting mechanism of the second electric block has a protrusion.

5. The electronic constructive object of claim 2, wherein an outer surface of each of the first electric block and the second electric block is provided with multiple contact portions, the contact portion connected to a positive end of electricity is placed at a center of each contact surface of the first electric block and the second electric block, and other contact portions are placed a peripheral position of each contact surface of the first electric block and the second electric block to connect a negative end of electricity.

6. The electronic constructive object of claim 2, wherein the first room of the first electric block has a battery which is connected onto a conductor on a surface of the first electric block.

7. The electronic constructive object of claim 2, wherein the first electric block or the second electric block is disposed with two or more contact portions connected with a touch switch.

8. The electronic constructive object of claim 2, wherein the first room or the second room has a motor connected to a conductor of the first or second electric block.

* * * * *